United States Patent
Kohno

(10) Patent No.: US 6,629,456 B2
(45) Date of Patent: Oct. 7, 2003

(54) THERMAL FLOWMETER FOR DETECTING RATE AND DIRECTION OF FLUID FLOW

(75) Inventor: Yasushi Kohno, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/994,051

(22) Filed: Nov. 27, 2001

(65) Prior Publication Data

US 2002/0073774 A1 Jun. 20, 2002

(30) Foreign Application Priority Data

Dec. 20, 2000 (JP) .................................. 2000-386850

(51) Int. Cl.⁷ ................................................ G01F 1/68
(52) U.S. Cl. ................................................ 73/204.26
(58) Field of Search .................... 73/204.26, 118.2, 73/204.16, 204.18

(56) References Cited

U.S. PATENT DOCUMENTS

| | | | |
|---|---|---|---|
| 4,399,698 A | 8/1983 | Hiromasa et al. | |
| 4,501,144 A | 2/1985 | Higashi et al. | |
| 4,669,301 A | 6/1987 | Kratt et al. | |
| 4,693,116 A | 9/1987 | Miura et al. | |
| 4,884,443 A | 12/1989 | Lee et al. | |
| 5,369,994 A | 12/1994 | Hecht | |
| 5,375,466 A | 12/1994 | Konzelmann | |
| 5,635,635 A | 6/1997 | Tsukada et al. | |
| 5,965,811 A | * 10/1999 | Kawai et al. | 73/118.2 |

FOREIGN PATENT DOCUMENTS

| | | |
|---|---|---|
| EP | 0 285 451 | 3/1988 |
| JP | 60-142268 | 7/1985 |
| JP | 61-213728 | 9/1986 |
| JP | A-62-14705 | 4/1987 |
| JP | 1-185416 | 7/1989 |
| JP | 6-160142 | 6/1994 |
| JP | 6-265385 | 9/1994 |
| JP | 07-209054 | 8/1995 |
| JP | 7-286876 | 10/1995 |
| JP | 8-14978 | 1/1996 |
| JP | 10-62220 | 3/1998 |
| JP | 2000-193505 | 7/2000 |

OTHER PUBLICATIONS

Kohn et al; SN 09/421,086; Fluid Flow Amount Measuring Apparatus Responsive to Fluid Flow in Forward and Reverse Directions; Oct. 13, 1999.

* cited by examiner

Primary Examiner—Edward Lefkowitz
Assistant Examiner—Takisha S Miller
(74) Attorney, Agent, or Firm—Nixon & Vanderhye P.C.

(57) ABSTRACT

A flowmeter includes a heating resistor and a resistive element for detecting the temperature of the heating resistor. The heating resistor is controlled so that the temperature detected by the resistive element approaches a reference temperature determined based on the temperature of the fluid flow. As a result, the temperature of the upstream side of the heating resistor becomes lower than the reference temperature, while the temperature of the downstream side of the heating resistor becomes higher than the reference temperature. Another resistive element is arranged on the upstream side or the downstream side of the heating resistor for detecting the rate of the fluid flow, and the rate and the direction of the fluid flow are detected by comparing the temperature of the resistive element with the reference temperature. This flowmeter is immune to variation in the resistance of the heating resistor.

21 Claims, 7 Drawing Sheets

THERMAL FLOWMETER FOR DETECTING RATE AND DIRECTION OF FLUID FLOW

CROSS REFERENCE TO RELATED APPLICATION

The present application relates to and incorporates herein by reference Japanese Patent Application No. 2000-386850 filed on Dec. 20, 2000.

BACKGROUND OF THE INVENTION

1. Field of the Invention

The present invention relates to a flowmeter for detecting a fluid flow rate.

2. Related Art

A thermal flowmeter is known as a device used for detecting the flow rate of inlet air in the internal-combustion engine of a vehicle or the like. In the inlet system of the vehicle, the intake of air pulsates at long periods when the engine operates at a low speed under a heavy load. If the period of the intake pulsation matches the opening period of an inlet valve and an exhaust valve, the inlet air may flow upstream via the inlet valve.

JP-A-H6-160142 proposes a thermal flowmeter which detects not only the rate but also the direction of inlet air flow. In the flowmeter, two resistive elements for detecting the flow rate are provided on the upstream side and the downstream side of a heating resistor, respectively. The direction of the flow is detected based on the difference between temperatures detected by the respective resistive elements.

If the resistive elements are arranged on the upstream side and the downstream side of the heating resistor like the flowmeter according to JP-A-H6-160142, a thermal conductor such as a Si3N4 film whose area is relatively large should be employed for heat exchange among the inlet air, the heating resistor and the resistive elements. Therefore the detection sensitivity and responsiveness of the flowmeter are relatively low, because the heat capacity of the thermal conductor is relatively high. Further the air heated by the heating resistor surrounds the resistive element on the downstream side, and therefore the temperature of the resistive element varies only slightly due to the temperature of the inlet air. Accordingly the detection sensitivity of the flowmeter is still relatively low.

JP-A-2000-193505 (U.S. application Ser. No. 09/421086) also proposes a thermal flowmeter which detects the rate and the direction of a fluid flow. The flowmeter includes a resistive element for detecting the flow rate only on the upstream side of a heating resistor, and takes advantage of variation in the temperature distribution in the heating resistor to detect the rate and the direction of the flow. Therefore the flowmeter can employ a thermal conductor which has a relatively low heat capacity, and consequently its detection sensitivity and the responsiveness are improved.

However, the resistance of the heating resistor may vary due to migration across the ages, and the variation in the resistance is often reflected in the output characteristics of the flowmeter. Further dust or dirt laid on the flowmeter cannot be removed by passing a high current through the heating resistor, because the resistance of the heating resistor varies in response to the high current. Therefore the output characteristics of the flowmeter further vary across the ages due to the dust or dirt laid thereon.

SUMMARY OF THE INVENTION

It is an object of the present invention to provide a flowmeter which can detect the flow rate of a fluid precisely whether the fluid flows in the normal direction or the reverse direction, and whose output characteristics vary only slightly across the ages.

It is another object of the present invention to provide a flowmeter in which dust or dirt laid thereon can be removed by heating.

A flowmeter according to the present invention includes fluid temperature detection means, a heating resistor, flow rate detection means, heat temperature detection means, detection means, and control means. The fluid temperature detection means detects the temperature of a fluid flow. The flow rate detection means is arranged on the upstream side or downstream side of the heating resistor with reference to the fluid flow. The heat temperature detection means detects the temperature of the heating resistor.

The control means controls the temperature of the heating resistor so that the temperature detected by the heat temperature detection means approaches a reference temperature determined based on the temperature detected by the fluid temperature detection means. As a result, the temperature of the flow rate detection means varies depending on the rate and the direction of the fluid flow. The detection means detects the rate and the direction of the fluid flow based on the temperature of the flow rate detection means.

Preferably, the heating resistor has a plurality of protrusions which are serially connected by turning-back portions and extend in a direction, and each of the protrusions includes two elongated portions and a turning-back portion connecting therebetween. Thus the heating resistor is formed so as to have a predetermined width in the direction parallel to the fluid flow. The flow rate detection means is arranged so that the temperature of the flow rate detection means is lower than the reference temperature when fluid flows from the flow rate detection means to the heating resistor and higher than the reference temperature when fluid flows from the heating resistor to the flow rate detection means. The detection means detects the rate and the direction of the fluid flow by comparing the temperature of the flow rate detection means with the reference temperature or the temperature detected by the fluid temperature detection means.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE PREFERRED EMBODIMENT

Figure 1A:
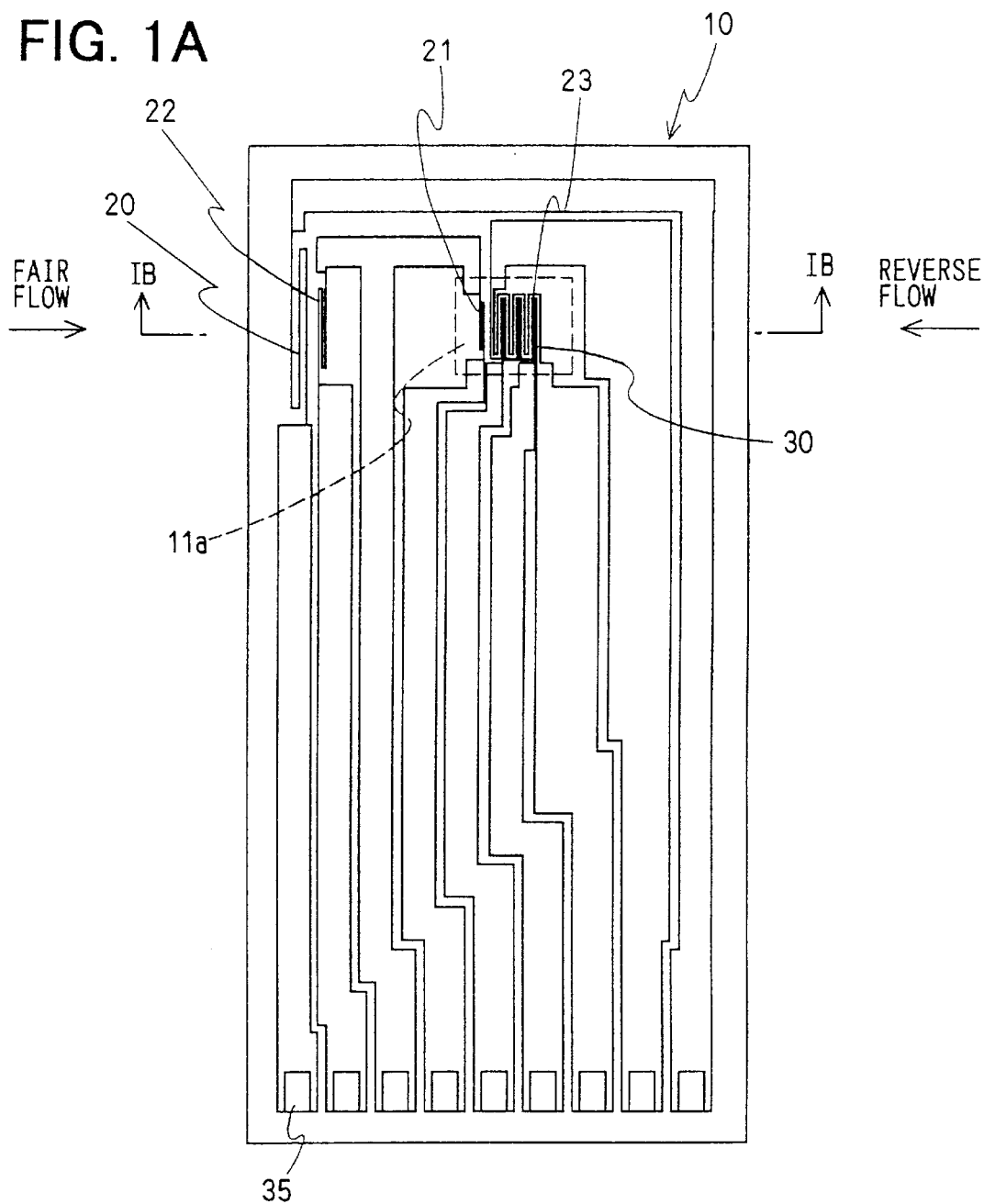
FIG. 1A is a plan view of the sensor portion of a flowmeter according to an embodiment of the present invention.
Figure 1B:
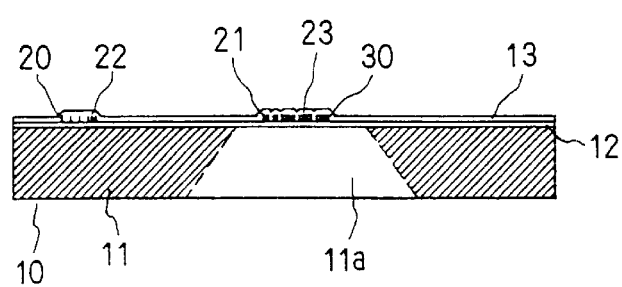
FIG. 1B is a cross-sectional view of FIG. 1A taken along the line IB—IB.
Figure 2A:
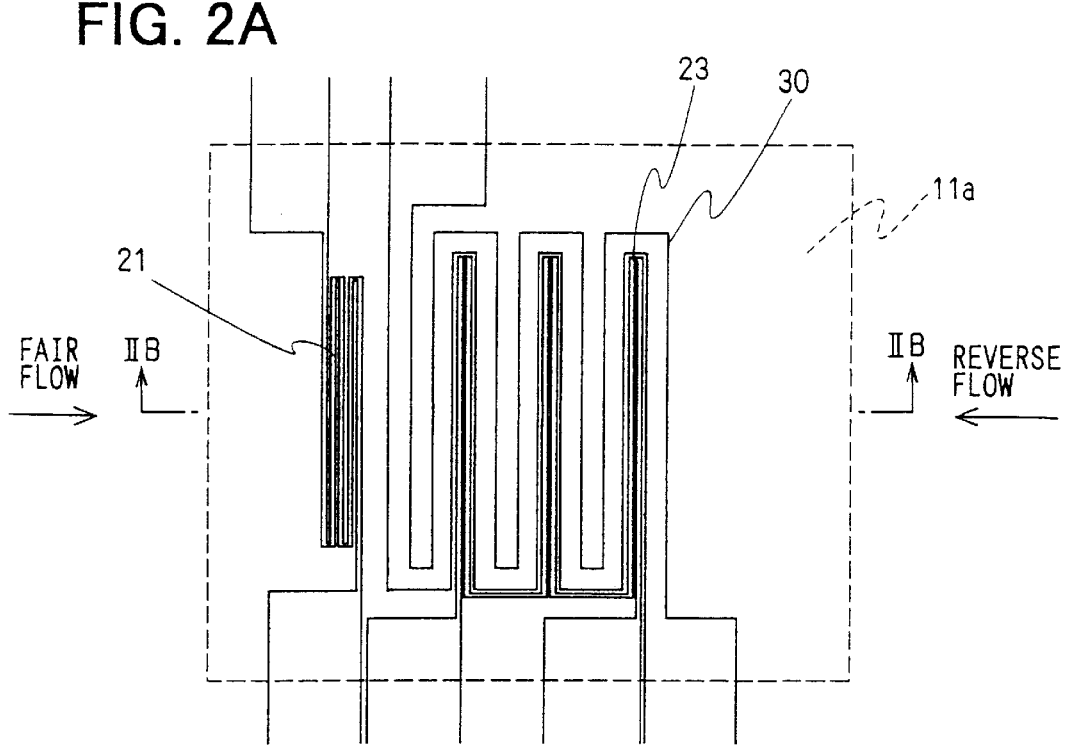
FIG. 2A is an enlarged view of a portion of FIG. 1A.
Figure 2B:
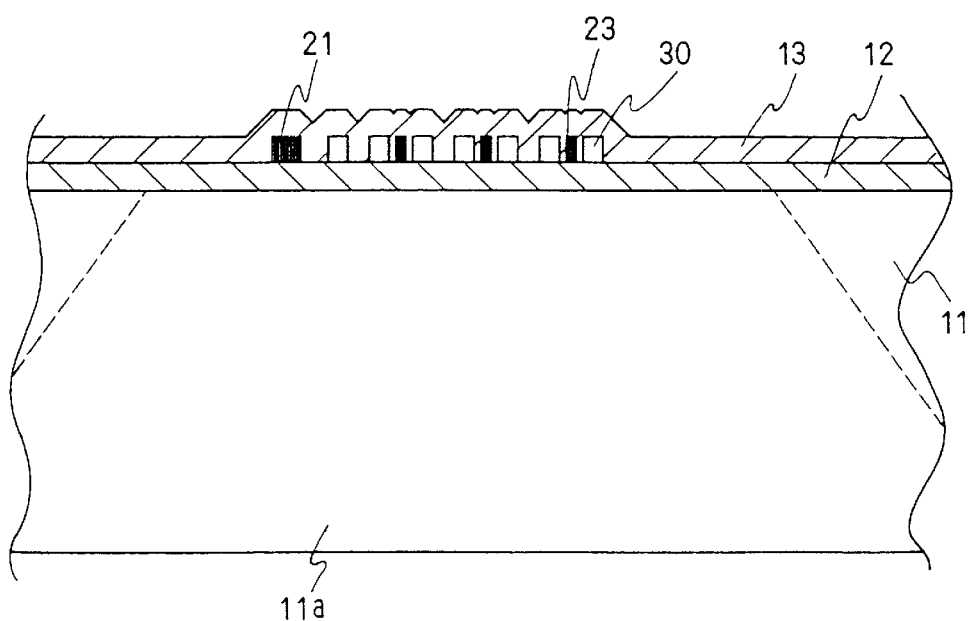
FIG. 2B is a cross-sectional view of FIG. 2A taken along the line IIB—IIB.

A flowmeter according to an embodiment of the present invention is incorporated in an engine as an air flow meter for measuring inlet air. The flowmeter includes a sensor portion and an external circuit. Referring to FIGS. 1A and 1B, the sensor portion 10 includes a semiconductor substrate 11 made of silicon or the like. A lower insulating film 12 is formed on the substrate 11, and further an upper insulating film 13 is formed on the lower insulating film 12. Referring to FIGS. 2A and 2B, the sensor portion 10 further includes a heating resistor 30, a first resistive element 20 as fluid temperature detection means, a second resistive element 22, a third resistive element 21 as flow rate detection means, and a fourth resistive element 23 as heat temperature detection means.

The first and second resistive elements 20, 22 detect the temperature of inlet air. The third resistive element 21 detects the flow rate of the inlet air. The fourth resistive element 23 detects the temperature of the heating resistor 30.

A cavity 11a is formed in the substrate 11, and the insulating films 12, 13 also cover the cavity 11a of the substrate 11. The third and fourth resistive elements 21, 23 and heating resistor 30 are formed on a part of the first insulating film 12 corresponding to the cavity 11a. The first and third resistive elements 20, 21 and the heating resistor 30 are arranged in this order in the direction of the fair flow. That is, the first resistive element 20 is arranged on the upstream side, and the heating resistor 30 is arranged on the downstream side.

The first resistive element 20 for detecting the temperature of inlet air is arranged adequately apart from the heating resistor 30 so that the temperature of the inlet air is detected without being affected by the temperature of the heating resistor 30. The third resistive element 21 for detecting the flow rate is arranged on the upstream side of the heating resister 30 as described above.

The heating resistor 30 has a plurality of protrusions which are serially connected by turning-back portions and extend in the direction perpendicular to the direction of the flow, and each of the protrusions includes two elongated portions and a turning-back portion connecting therebetween. Thus the heating resistor 30 is formed so as to have a predetermined width in the direction of the flow. The fourth resistive element 23 also has a plurality of protrusions so as to extend along the heating resistor 30. Thus the fourth resistive element 23 is formed in the close vicinity of the heating resistor 30 so as to be capable of detecting the temperature nearly equal to that of the heating resistor 30.

The first, third, and fourth resistive elements 20, 21, 23, and the heating resistor 30 are connected to the external circuit via terminals 35. The resistive elements 20–23, the heating resistor 30, and the terminals 35 are made of platinum or the like.

The first, third and fourth resistive elements 20, 21, 23 and the heating resistor 30 is wrapped with the insulating films 12, 13 so that heat is exchanged among the resistive elements 20, 21, 23 and the heating resistor 30 via the insulating films 12, 13. Each of the lower and upper insulating films 12, 13 is a bilayer including a $Si_3N_4$ film and a $SiO_2$ film.

The $Si_3N_4$ film and the $SiO_2$ film are provided as a film for compressive stress and a film for tensile stress, respectively. Thereby the stress of the resistive elements 21–23 and the heating resistor 30 can be reduced. Further the heating resistor 30 is arranged in the center of the portion of the lower insulating film 12 corresponding to the cavity 11a of the substrate 11. Therefore the portion of the insulating films 12, 13 corresponding to the cavity 11a is immune to thermal stress and not prone to wrap due to temperature variation. A film made of $TlO_2$, $Al_2O_3$, $Ta_2O_5$, MgO or the like may be employed instead of the $SiO_2$ film.

Figure 3:
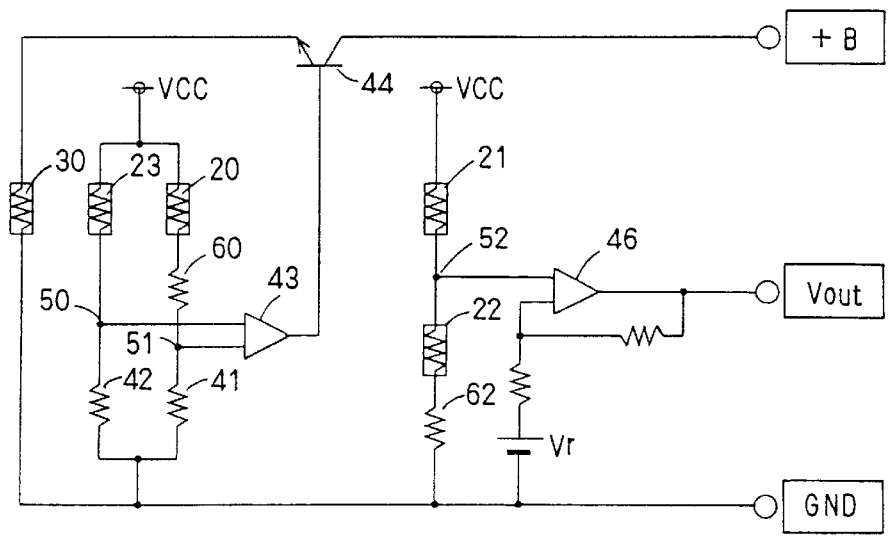
FIG. 3 is a view of an equivalent circuit of the flowmeter.

FIG. 3 shows an equivalent circuit of the flowmeter which includes the sensor portion 10 and the external circuit. The flowmeter includes a bridge circuit, a comparator 43, and a transistor 44 as control means. The bridge circuit includes the first resistive element 20, the fourth resistive element 23, and fixed resistors 41, 42, 60.

The resistance of the heating resistor 30 and the elements 20, 23, 41, 42, 60 of the bridge circuit is set so that the heating resistor 30 is controlled by the control means including the bridge circuit so as to have a reference temperature which is higher than the temperature detected by the first resistive element 20 by the constant temperature difference. That is, the heating resistor 30 is controlled to the reference temperature which varies depending on the temperature detected by the first resistive element 20. The resistor 60 has resistance whose temperature coefficient is low, and it is provided only for setting the temperature coefficient of the resistance of the portion which includes the first resistive element 20 and the resistor 60.

When the temperature detected by the fourth resistive element 23 become lower than the reference temperature, the resistance of the fourth resistive element 23 decreases. Then potential difference is produced between middle points 50, 51 of the bridge circuit, and consequently the transistor 44 is turned on by the output from the comparator 43. Thereby the current to the heating resistor 30 is switched on, and then the temperature of the heating resistor 30 increases. Thereafter, when the temperature of the heating resistor 30 detected by the fourth resistive element 23 reaches the reference temperature, the transistor 44 is turned off by the output from the comparator 43 and thereby the current to the heating resistor 30 is switched off. Thus the heating resistor 30 is controlled by the control means including the bridge circuit so as to have the reference temperature higher than the temperature detected by the first resistive element 20 by the constant temperature difference.

Further in the flowmeter, the second and third resistive element 22, 21, together with a fixed resistor 62 and an amplifier 46 and the like, form detecting means. The resistor 62 has resistance whose temperature coefficient is low, and it is provided only for setting the temperature coefficient of the resistance of the portion which includes the second resistive element 22 and the resistor 62. The detecting means amplifies the potential of the middle point 52, which varies with the ratio of the resistance of the third resistive element 21 to the resistance of the portion which includes the second resistive element 22 and the resistor 62, by the amplifier 46 and outputs the amplified potential.

The temperature of the third resistive element 21 varies depending on the rate and the direction of the inlet air flow, and then the resistance of the third resistive element 21 also varies. As a result, the output from the amplifier 46 also varies. However, the temperature detected by the third resistive element 21 also varies depending on the temperature of the inlet air. That is, the temperature detected by the third resistive element 21 includes information on the temperature of the inlet air and information on the rate and direction of the inlet air flow. The second resistive element 22 is provided for eliminating the information on the temperature of the inlet air from the temperature detected by the third resistive element 21.

Figure 4A:
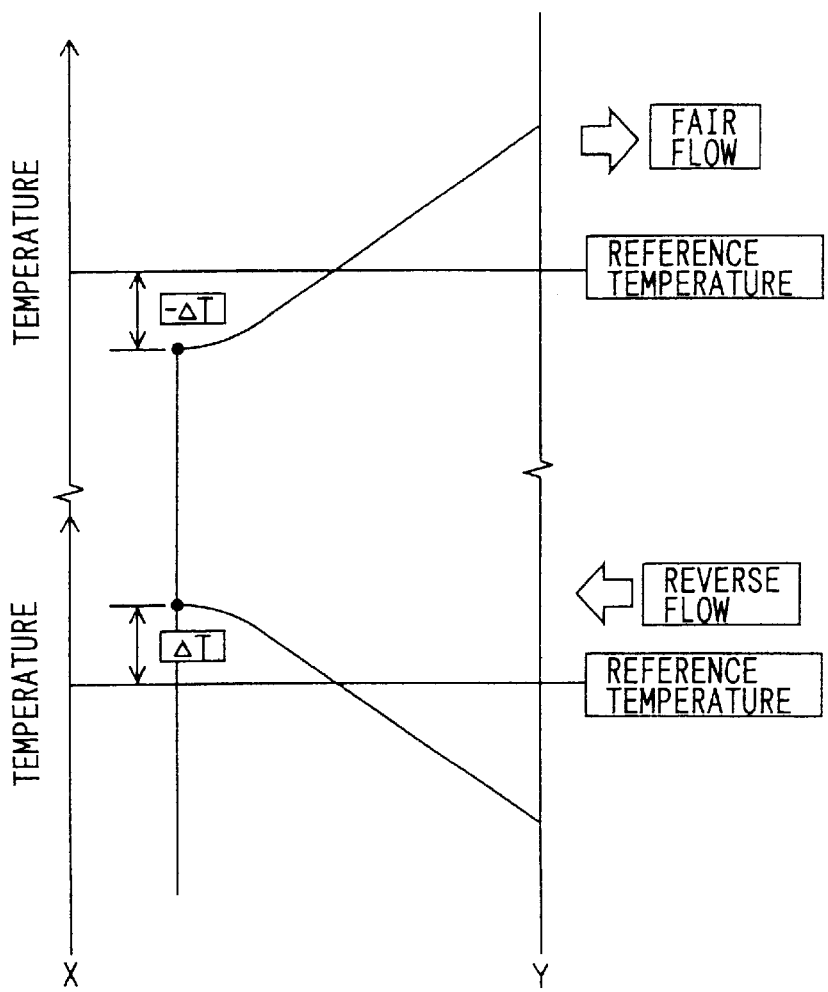
FIG. 4A is a graph of the temperature distribution in a heating resistor of the flowmeter.
Figure 4B:
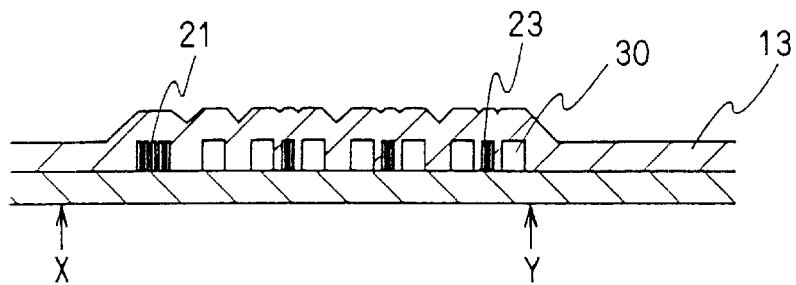
FIG. 4B is a schematic view showing the correspondence of the heating resistor to FIG. 4A.

FIG. 4A shows the temperature distribution in the heating resistor 30 relative to the reference temperature. FIG. 4B shows the positional correspondence of the heating resistor 30 to FIG. 4A. The inlet air cools the upstream side of the heating resistor 30 more than the downstream side. Therefore the temperature of the upstream side becomes lower than the reference temperature in response to the inlet air flow. Then, the temperature of the upstream side of the fourth resistive element 23 decreases, and consequently the resistance of the entire fourth resistive element 23 also decreases.

Then the transistor 44 is turned on, and the current to the heating resistor 30 increases. Then the temperature of the downstream side of the heating resistor 30 becomes higher than the reference temperature, while the temperature of the upstream side remain lower than the reference temperature. In response to the increase in the temperature of the downstream side of the heating resistor 30, the temperature of the downstream side of the fourth resistive element 23 increases. Then the resistance of the downstream side of the fourth resistive element 23 increases, and consequently the resistance of the entire fourth resistive element 23 also increases.

The heat is not easily transmitted from the downstream side to the upstream side in the heating resistor 30, because the heat transfer length of the heating resistor 30 from the downstream side to the upstream side is relatively long. Accordingly, the temperature of the upstream side of the heating resistor 30 is kept lower than the reference temperature, while the temperature of the downstream side of the heating resistor 30 is kept higher than the reference temperature.

The third resistive element 21 is arranged on the upstream side of the heating resistor 30 with reference to the fair flow of the inlet air. Therefore the third resistive element 21 detects the temperature nearly equal to the temperature of the upstream side of the heating resistor 30. Therefore the temperature detected by the third resistive element 21 is lower than the reference temperature when the inlet air flows in the normal direction, while it is higher than the reference temperature when the inlet air flows in the reverse direction as shown in FIG. 4A.

Figure 5:
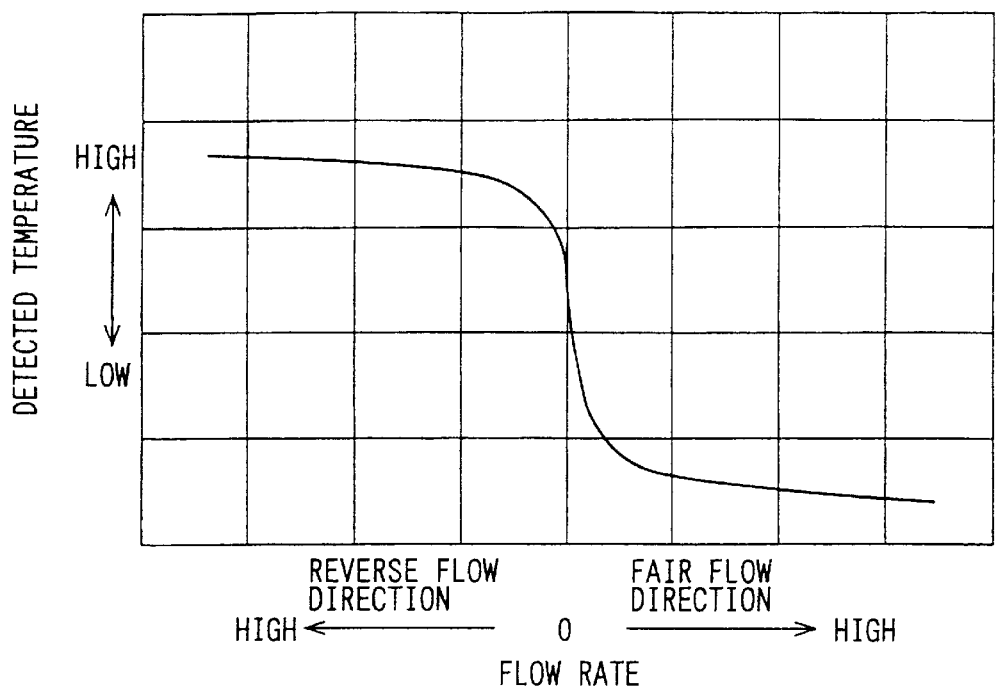
FIG. 5 is a graph showing the relation between the temperature detected by a resistive element for detecting a flow rate and the air flow rate.

FIG. 5 shows the relation between the temperature detected by the third resistive element 21 and the direction and the rate of the inlet air flow. It is found that the difference between the reference temperature and the detected temperature increases as the flow rate increases whether the air flows in the normal direction or the reverse direction. The graph shown in FIG. 5 varies depending on the temperature of the inlet air, because the reference temperature varies depending on the temperature of the inlet air detected by the first and second resistive elements 20, 22.

The direction and the rate of the inlet air flow can be detected by comparing the temperature detected by the third resistive element 21 with the temperature detected by the first resistive element 20 or the fourth resistive element 23. Alternatively, the potentials at the respective middle points 50, 52 are sent to an ECU, and the ECU detects the direction and the rate of the inlet air flow by referring to a map which is stored beforehand and relates values of the potentials at the middle points 50, 52 with the rate and direction of the air flow.

The reference temperature is set to an appropriate value based on the temperature detected by the first resistive element 20 in consideration of variation in heat conductivity of fluid between the heating resistor 30 and the third resistive element 21 or a supporting member (heat conductor) holding the heating resistor 30 and the third resistive element 21 due to variation in the temperature of the fluid. Thus the reference temperature is optimally adjusted so that the rate and the direction of the inlet air flow can be precisely detected regardless of the variation in the temperature of the fluid flow only based on the temperature detected by the third resistive element 21.

In the present flowmeter, the resistive element 21 for detecting the flow rate is required to be arranged only on the one side of the heating resistor 30, and hence the sensor portion 10 can be miniaturized and have a low heat capacity. Further, the reference temperature is adjusted based on the temperature of the inlet air so that the difference between the temperature of the third resistive element 21 and reference temperature can be clearly observed. Therefore the present flowmeter is sensitive and responsive to the rate and the direction of the inlet air flow.

Figure 6:
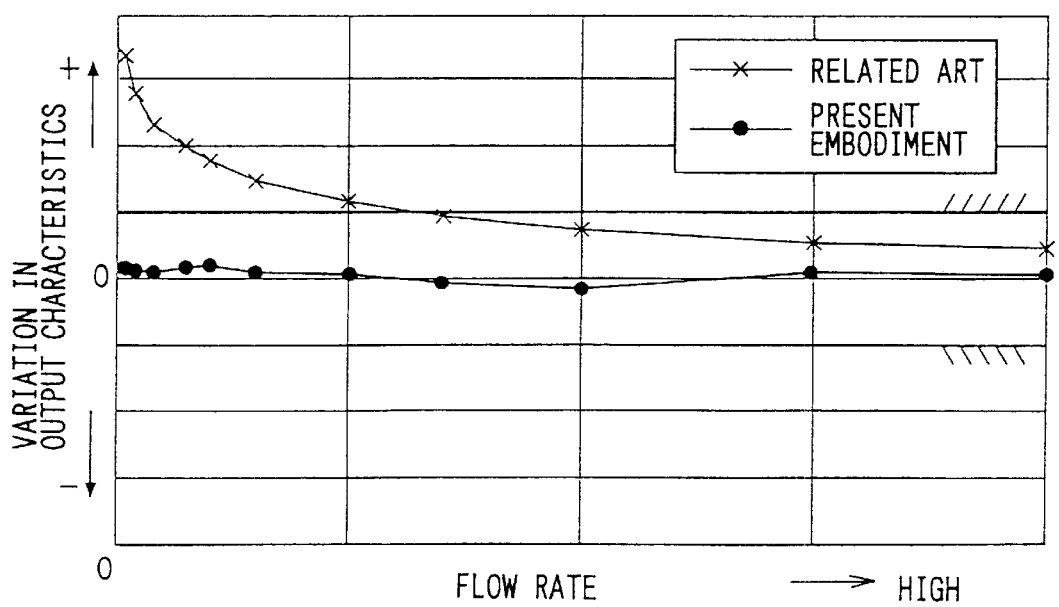
FIG. 6 is a graph showing the relation between the air flow rate and variation in the output characteristics of the flowmeters according to the embodiment and related art, respectively.

FIG. 6 shows the relation between the flow rate of the inlet air and variation in the output characteristics of the flowmeters according to the present embodiment and related art, respectively. It is found that the output characteristics of the present flowmeter vary only slightly depending on the flow rate of the inlet air.

Further, in the present flowmeter, the heating resistor 30 is controlled to the reference temperature based on the temperature of the heating resistor 30 detected by the fourth resistive element 23 and the temperature of the inlet air detected by the first resistive element 21. Therefore the heating resistor 30 can be controlled to the proper reference temperature, even if the resistance of the heating resistor 30 varies due to migration or the like. That is, the output characteristics of the present flowmeter vary only slightly across the ages. Moreover, in the present flowmeter, dust or dirt laid on the sensor portion 10 can be removed by passing a high current through the heating resistor 30. Therefore the variation of the output characteristics of the flowmeter across the ages is further suppressed.

Figure 7A:
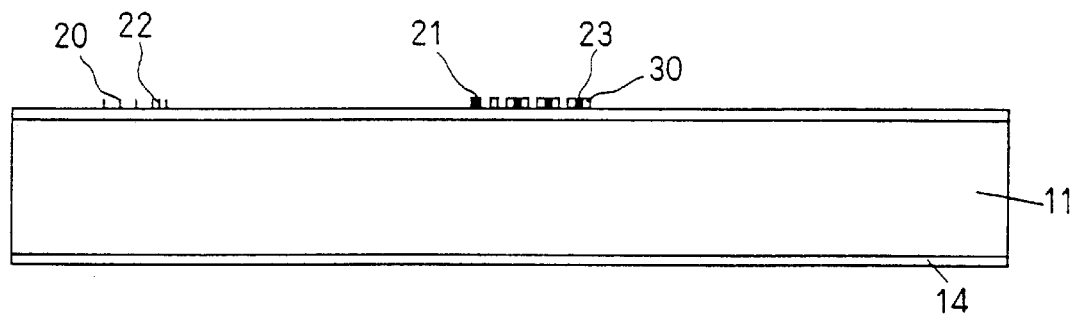
FIGS. 7A–7C are schematic diagrams showing a manufacturing process of the sensor portion of the flowmeter.

The sensor portion 10 is manufactured as follows. Referring to FIG. 7A, a silicon substrate 11 on the bottom of which a $SiN_4$ film 14 is formed is prepared. Then the $Si_3N_4$ film and the $SiO_2$ film are formed on the silicon substrate 11. Thus the lower insulating film 12 is formed. Next, a Ti layer of 50 Å is formed on the lower insulating film 12 as an adhesive layer. Thereafter Pt is deposited on the adhesive layer using a vacuum evaporator at 200° C., so that a Pt film of 2000 Å is formed. The Pt film is etched to define the resistive elements 20–23, the heating resistor 30, and the terminals 35. NiCr, TaN, SiC, W or the like may be employed instead of Pt.

Figure 7B:
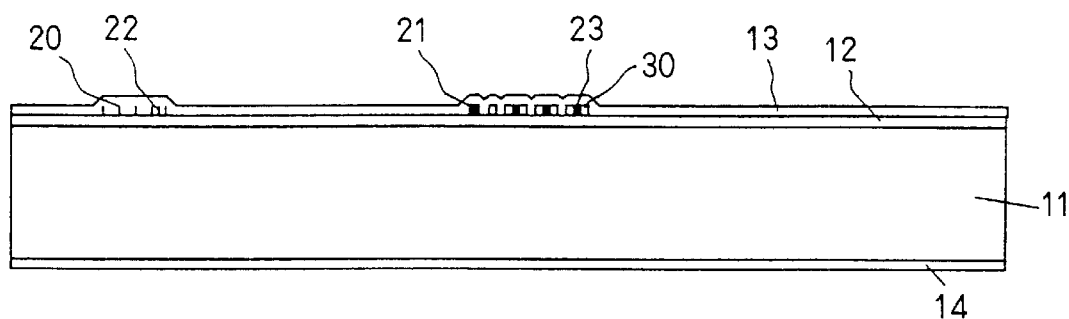

Referring to FIG. 7B, the $Si_3N_4$ film and the $SiO_2$ film are formed on the insulating layer 12 and over the resistive elements 21–23, the heating resistor 30 and the terminals 35. Thus the upper insulating film 13 is formed. The upper insulating film 13 is partly removed by etching so that the terminals 35 are exposed.

Figure 7C:
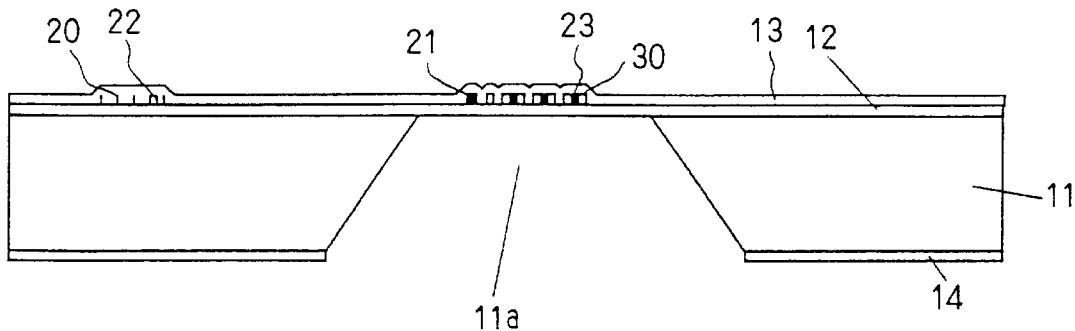

Referring to FIG. 7C, the SiN₄ film 14 on the bottom of the substrate 11 is partly removed by etching so that a portion of the bottom of the substrate 11 is exposed. The portions of the resultant structure other than the exposed portion are covered with a Si₃N₄ film or a SiO₂ film. Therefore the cavity 11a can be formed when the substrate 11 is anisotorpic-etched from its bottom side using a TMAH solution. However, the cavity 11a may be formed by a manner other than the anisotorpic etching using the TMAH solution. Thus the flowmeter is completed.

Modifications

Figure 8:
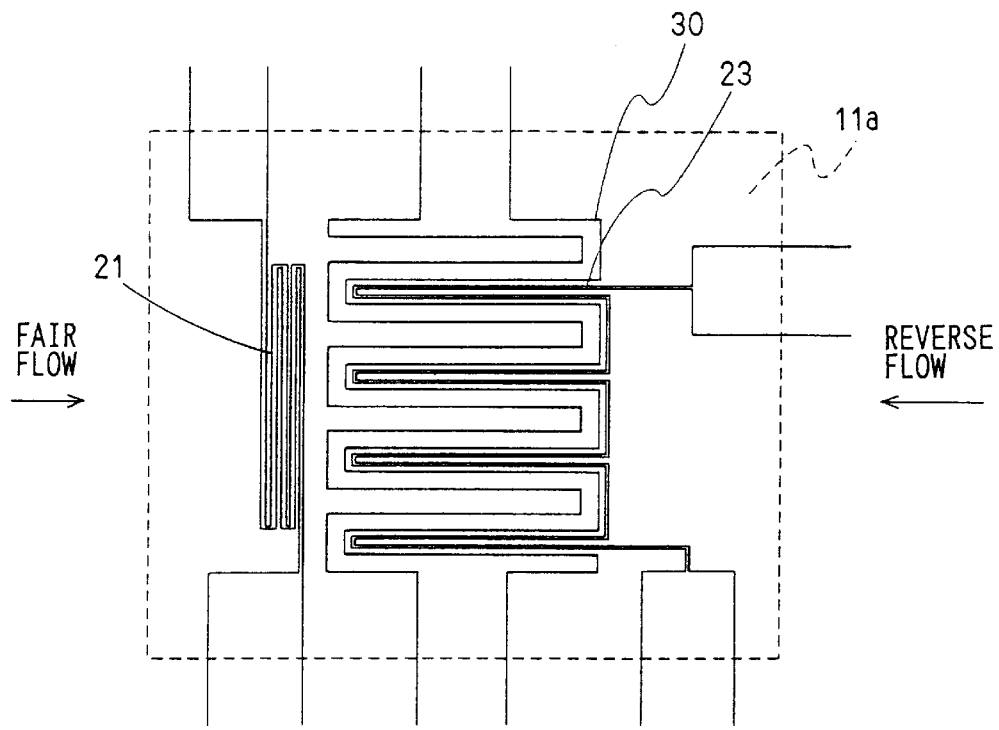
FIG. 8 is a schematic diagram of the sensor portion of a flowmeter according to a modification.

In the above embodiment, as shown in FIG. 8, the protrusions of the heating resistor 30 may extend in the direction parallel to the direction of the flow instead of the direction perpendicular to the direction of the flow. In this case, the heating resistor 30 also has a predetermined width in the direction of the flow, and the protrusions of the fourth resistive element 23 should extend in the direction parallel to the direction of the flow along the heating resistor 30.

Figure 9:
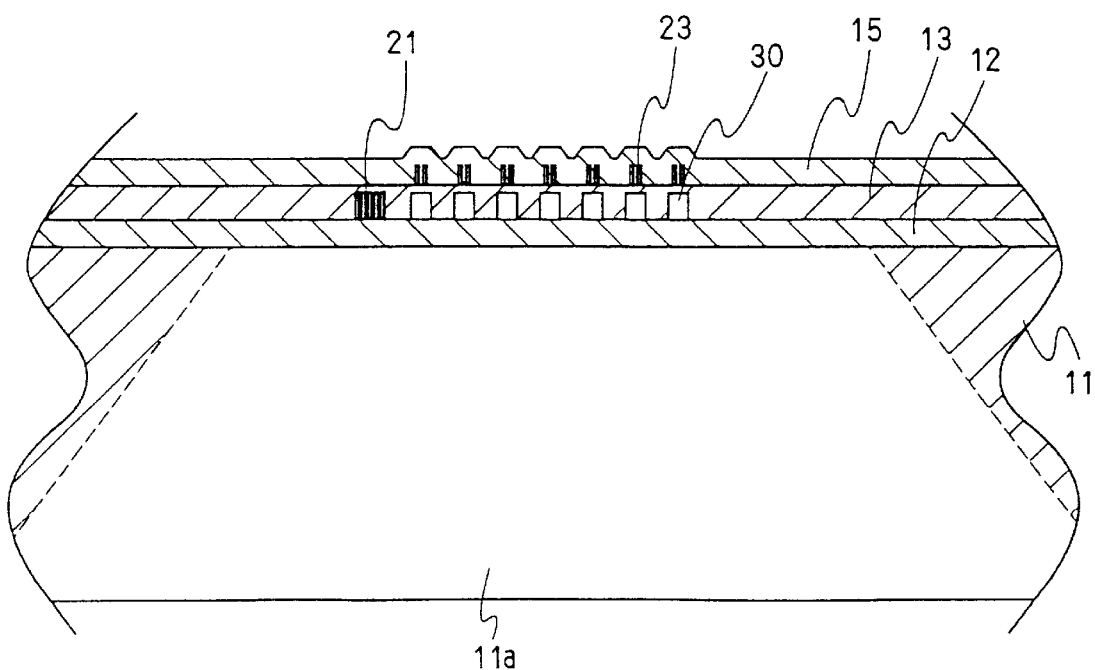
FIG. 9 is a schematic diagram of the sensor portion of a flowmeter according to another modification.

Further in the above embodiment, the fourth resistive element 23 may be formed on the upper insulating film 13 as shown in FIG. 9. In this case, a top insulating film 15 is further formed on the upper insulating film 13, and the resistive element 23 is arranged over the heating resistor 30 so as to run along the top of the heating resistor 30. Thus the resistive element 23 is arranged closer to the heating resistor 30 than the above embodiment. Therefore the resistive element 23 can detect the temperature of the heating resistor 30 more accurately than the above embodiment.

In the present modification, the heating resistor 30 and the fourth resistive element 23 may be arranged inversely. That is, the heating resistor 30 may be formed on the upper insulating film 13 and the fourth resistive element 23 may be formed on the lower insulating film 12.

In the above embodiment, the temperature detected by the third resistive element 21 also varies depending on the distance between the third resistive element 21 and the heating resistor 30. When the distance is relatively long, the temperature detected by the third resistive element 21 may be lower than the reference temperature even if the third resistive element 21 is arranged on the downstream side of the heating resistor 30. Therefore the reference temperature may be modified according to the distance between the third resistive element 21 and the heating resistor 30.

In the above embodiment and modifications, each of the insulating films 12, 13, 15 may be a monolayer film or a multilayer film.

The flowmeter according to the present invention may be incorporated in a device other than the engine, and used for detecting the flow rate of fluid other than air.

What is claimed is:

1. A flowmeter for detecting a rate and a direction of a fluid flow comprising:
   fluid temperature detection means for detecting a temperature of said fluid flow;
   a heating resistor;
   flow rate detection means arranged on only one of an upstream side and a downstream side of said heating resistor with reference to said fluid flow for detecting the rate of said fluid flow;
   detection means for detecting the rate and the direction of said fluid flow;
   heat temperature detection means, apart from the heating resistor, for detecting a temperature of said heating resistor; and
   control means for controlling the temperature of said heat resistor so that the temperature detected by said heat temperature detection means approaches a reference temperature determined based on the temperature detected by said fluid temperature detection means,
   wherein a temperature of said flow rate detection means varies depending on the rate and the direction of said fluid flow, and
   wherein said detection means detects the rate and the direction of said fluid flow based on the temperature of said flow rate detection means.

2. A flowmeter as in claim 1,
   wherein said heating resistor has a predetermined width in the direction parallel to said fluid flow and is arranged so as to provide a temperature distribution in which a temperature of the upstream side of said heating resistor is lower than said reference temperature in response to said fluid flow and a temperature of the downstream side of said heating resistor is higher than said reference temperature, and
   said heating resistor and said flow rate detection means are relatively arranged so that the temperature of said flow rate detection means varies due to a reversal of the temperature distribution in response to a change in the direction of said fluid flow.

3. A flowmeter as in claim 2,
   wherein said heating resistor has a plurality of protrusions which are serially connected by turning-back portions and extend in a direction, and each of said plurality of protrusions includes two elongated portions and a turning-back portion connected therebetween.

4. A flowmeter as in claim 3, wherein said heat temperature detection means has a plurality of protrusions which are serially connecting by turning-back portions and extend along said heating resistor, and each of said plurality of protrusions includes two elongated portions and a turning-back portion connected therebetween.

5. A flowmeter as in claim 1,
   wherein said flow rate detection means is arranged so that the temperature of said flow rate detection means is lower than said reference temperature when fluid flows from said flow rate detection means to said heating resistor and higher than said reference temperature when fluid flows from said heating resistor to said flow rate detection means.

6. A flowmeter as in claim 1,
   wherein said detection means detects the rate and the direction of said fluid flow by comparing the temperature of said flow rate detection means with one of said reference temperature and the temperature detected by said fluid temperature detection means.

7. A flowmeter for detecting a rate and a direction of a fluid flow comprising:
   a substrate;
   a heating resistor formed on the substrate;
   a flow rate detection resistive element formed on the substrate so that the flow rate detection resistive element is thermally affected by the heating resistor, the flow rate detection resistive element being arranged on only one of an upstream side and a downstream side of the heating resistor with respect to the fluid flow;
   a detection circuit coupled with the flow rate detection resistive element, the detection circuit detecting the rate and the direction of the fluid flow based on the temperature indicated by the flow rate detection resistive element;

a fluid temperature detection resistive element formed on the substrate in a thermally isolated manner from the heating resistor;

a heat temperature detection resistive element formed on the substrate, the heat temperature detection resistive element being formed apart from but adjacent to the heating resistor closer to the heating resister than the flow rate detection resistive element so as to detect the temperature of the heating resistor; and control circuit coupled with the fluid temperature detection resistive element, the heating resistor and the heat temperature detection resistive element, the control circuit controlling a current flowing through the heating resistor so that the temperature indicated by the heat temperature detection resistive element approaches a reference temperature determined based on the temperature indicated by the fluid temperature detection resistive element.

8. The flowmeter as in claim 7, wherein the substrate has a cavity located under the heating resistor, the heat temperature detection resistive element, and the flow rate detection resistive element.

9. A flowmeter as in claim 7, wherein said heating resistor has a predetermined width in the direction parallel to said fluid flow and is arranged so as to provide a temperature distribution in which a temperature of the upstream side of said heating resistor is lower than said reference temperature in response to said fluid flow and a temperature of the downstream side of said heating resistor is higher than said reference temperature is maintained.

10. A flowmeter as in claim 9, wherein the temperature of said flow rate detection resistive element varies due to variation in a temperature distribution in said heating resistor in response to a change in the direction of said fluid flow.

11. A flowmeter as in claim 9, wherein said heating resistor has a plurality of protrusions which are serially connected by turning-back portions and extend in a direction, and each of said plurality of protrusions includes two elongated portions and a turning-back portion connected therebetween.

12. A flowmeter as in claim 4, wherein said heat temperature detection resistive element has a plurality of protrusions which are serially connected by turning-back portions and extend along said heating resistor, and each of said plurality of protrusions includes two elongated portions and a turning-back portion connected therebetween.

13. A flowmeter as in claim 7, wherein said flow rate detection resistive element is arranged so that the temperature of said flow rate detection resistive element is lower than said reference temperature when fluid flows from said flow rate detection resistive element to said heating resistor and higher than said reference temperature when fluid flows from said heating resistor to said flow rate detection resistive element.

14. A flowmeter as in claim 7, wherein said detection circuit detects the rate and the direction of said fluid flow by comparing the temperature of said flow rate detection resistive element with one of said reference temperature and the temperature detected by said fluid temperature detection resistive element.

15. A method of detecting a rate and a direction of fluid flow, the method comprising:

detecting a temperature of said fluid flow utilizing a fluid temperature detector;

providing a heating resistor;

detecting the rate and the direction of said fluid flow based on a temperature measured by a flow rate detector which is arranged on only one of an upstream side and a downstream of the heating resistor with reference to said fluid flow;

detecting a temperature of said heating resistor utilizing a heat temperature detector which is apart from the heating resistor; and controlling the temperature of said heating resistor so that the temperature detected by said heat temperature detector approaches a reference temperature determined based on the temperature detected by said fluid temperature detector, wherein the temperature of said flow rate detector varies depending on the rate and the direction of said fluid flow.

16. A method as in claim 15, wherein said heating resistor has a predetermined width in the direction parallel to said fluid flow and provides a temperature distribution in which a temperature of the upstream side of said heating resistor is lower than said reference temperature in response to said fluid flow and a temperature of the downstream side of said heating resistor is higher than said reference temperature.

17. A method as in claim 16, wherein the temperature of said flow rate detector varies due to a reversal of the temperature distribution in response to a change in the direction of said fluid flow.

18. A method as in claim 16, wherein said heating resistor has a plurality of protrusions which are serially connected by turning-back portions and extend in a direction, and each of said plurality of protrusions includes two elongated portions and a turning-back portion connected therebetween.

19. A method as in claim 18, wherein said heat temperature detector has a plurality of protrusions which are serially connected by turning-back portions and extend along said heating resistor, and each of said plurality of protrusions includes two elongated portions and a turning-back portion connected therebetween.

20. A method as in claim 15, wherein said flow rate detector is arranged so that the temperature of said flow rate detector is lower than said reference temperature when fluid flows from said flow rate detector to said heating resistor and higher than said reference temperature when fluid flows from said heating resistor to said flow rate detector.

21. A method as in claim 15, wherein detection of the rate and the direction of said fluid flow is accomplished by comparing the temperature of said flow rate detector with one of said reference temperature and the temperature detected by said fluid temperature detector.

* * * * *